US011196478B1

(12) United States Patent
Nagelberg et al.

(10) Patent No.: US 11,196,478 B1
(45) Date of Patent: Dec. 7, 2021

(54) DISTRIBUTING WIRELESS RELAYS TO FORM AN AD HOC WIRELESS NETWORK

(71) Applicant: United Services Automobile Association (USAA), San Antonio, TX (US)

(72) Inventors: Alexander B. Nagelberg, San Antonio, TX (US); Jess Gingrich, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 15/904,697

(22) Filed: Feb. 26, 2018

Related U.S. Application Data

(60) Provisional application No. 62/464,658, filed on Feb. 28, 2017.

(51) Int. Cl.
| | |
|---|---|
| *H04W 16/18* | (2009.01) |
| *H04B 7/185* | (2006.01) |
| *H04N 7/18* | (2006.01) |
| *H04W 84/18* | (2009.01) |
| *H04W 84/00* | (2009.01) |

(52) U.S. Cl.
CPC ........ *H04B 7/18504* (2013.01); *H04W 16/18* (2013.01); *H04N 7/18* (2013.01); *H04W 84/005* (2013.01); *H04W 84/18* (2013.01)

(58) Field of Classification Search
CPC ............ B64C 39/024; B64C 2201/122; B64C 2201/027; B64C 2201/20; G08G 5/0069; H04B 7/18504; H04W 24/02; H04W 16/18; H04W 84/06; G05D 1/0022
See application file for complete search history.

(56) References Cited

U.S. PATENT DOCUMENTS

| | | | | |
|---|---|---|---|---|
| 9,894,158 | B2 * | 2/2018 | Ranasinghe | .......... H04W 4/023 |
| 9,949,138 | B2 * | 4/2018 | Zavesky | ............ H04B 7/18506 |
| 9,973,261 | B1 * | 5/2018 | Hardy | ................ H04B 7/18504 |
| 2014/0241239 | A1 * | 8/2014 | Chang | ................ H04B 7/18504 370/316 |
| 2014/0355476 | A1 * | 12/2014 | Anderson | ............. H04W 24/02 370/254 |
| 2016/0028471 | A1 * | 1/2016 | Boss | .................... H04B 7/2606 455/406 |
| 2016/0180144 | A1 * | 6/2016 | Tatourian | ............... G01C 21/00 382/104 |
| 2017/0181117 | A1 * | 6/2017 | Dowlatkhah | ....... H04W 64/003 |
| 2017/0181158 | A1 * | 6/2017 | Gong | ................ H04W 72/0433 |
| 2017/0295609 | A1 * | 10/2017 | Darrow | ................... G05D 1/104 |
| 2018/0002017 | A1 * | 1/2018 | Abeles | ...................... B64F 5/60 |
| 2019/0112049 | A1 * | 4/2019 | Phan | ..................... B64C 39/024 |

* cited by examiner

*Primary Examiner* — Liton Miah
(74) *Attorney, Agent, or Firm* — Fish & Richardson P.C.

(57) ABSTRACT

Techniques are described for a method of establishing a wireless ad hoc network using a series of wireless relays deployed in a geographical area where an extreme event has occurred. The deployed wireless relays may form a plurality of links between them to form the wireless ad hoc network where each of the wireless relays may serve as node in the wireless ad hoc network. The ad wireless hoc network may provide wireless services to devices within the geographical area. The wireless relays may be deployed to various locations within the geographical area using a plurality of unmanned aerial vehicles (UAVs) that may receive control commands from a relay control device.

15 Claims, 4 Drawing Sheets

DISTRIBUTING WIRELESS RELAYS TO FORM AN AD HOC WIRELESS NETWORK

CROSS-REFERENCE TO RELATED APPLICATION

This application claims priority to U.S. Provisional Application Ser. No. 62/464,658, filed on Feb. 28, 2017, the entirety of which is incorporated by reference into the present disclosure.

BACKGROUND

Extreme events, such as severe weather conditions including hurricanes, ice storms, flood, tornado, hurricane, can cause disruptions to communications networks. Communication networks include cellular networks and broadcast networks, such as those used in radio and television. These disruptions may prevent persons in a geographical area affected by the extreme event from access to information. For example, high winds or ice can cause damage to cell and radio towers, switches, and power lines causing outage to the wireless services and power. While some outages may be of a short-term duration (e.g., a few seconds), many outages require physical repair or maintenance to the transmission and distribution system before communications and power can be restored.

Additionally, damage to property and infrastructure caused by an extreme event is examined and cataloged in the field through manual assessments. These assessments are taken by physically visiting damaged property sites as well as gathering background information regarding the extent of damage. Such background information may include police reports, witness statements, and statement from various field experts, such as architects, construction personnel, and doctors. Assessments may also include information gathered from photos, video, and/or audio evidence as well as other on-site evidence. In some instances, however, affected areas may be too large for individuals to manage the gathering of information in timely manner. Furthermore, performing damage assessments in such areas may be dangerous for a period of time after the event.

SUMMARY

Implementations of the present disclosure are generally directed to establishing a wireless ad hoc network using a series of wireless relays deployed in a geographical area where an extreme event has occurred. The deployed wireless relays may form a plurality of links between them to form the wireless ad hoc network, where each of the wireless relays may serve as node in the wireless ad hoc network. The ad hoc wireless network may provide wireless services to devices within the geographical area. The wireless relays may be deployed to various locations within the geographical area using a network of unmanned aerial vehicles (UAVs) that may receive control commands from a relay control device. For example, the wireless relays may be deployed on the surface of a body of water within the geographical area as buoy relays, on or in proximity to a perimeter of the geographical area as a ground based relay, or above the geographical area secured as a payload of a UAV.

Implementations of the present disclosure are also directed to systems and methods for surveying an area of claim damage by using a network of UAVs controlled and managed using a relay control device to determine an impact of damage within a geographical area that has experienced an extreme event. In accordance with implementations of the present disclosure, UAVs may be controlled using a combination of satellite/terrestrial managed-flight control, and a full pilot control to survey damaged areas in an insurance claim. Further, implementations of the present disclosure provide for coordinating communication with an office site server, such as a home office station; through the relay control device, which may serve as a remote launch system. Implementations may also include the network of UAVs; a global navigation satellite systems (GNSS), such as a Global Positioning System (GPS), cameras, and electromagnetic frequencies and communication protocols, such as radio frequencies, to manage the activation, deployment, control, and safe return of the UAVs.

In general, innovative aspects of the subject matter described in this specification can be embodied in methods for establishing a wireless ad hoc network that include actions of: transmitting control signals to a plurality of UAVs, each of the UAVs being associated with a wireless relay configured to receive and transmit wireless communication signals, the control signals instructing the UAVs to deploy the wireless relays at one or more locations within a geographical area; and establishing, through the wireless communication signals, a plurality of links between the wireless relays to form the wireless ad hoc network; wherein each of the links connects two of the wireless relays, and wherein the wireless ad hoc network provides wireless services to one or more user devices within the geographical area.

Implementations can optionally include one or more of the following features: at least one of the wireless relays may be a buoy wireless relay that is deployed, by the associated UAV, on a body of water within the geographical area; at least one of the wireless relays may be a ground based relay that is deployed, by the associated UAV, on or in proximity to a perimeter of the geographical area; at least one of the wireless relays establishes communication with a cell tower and wherein the ad hoc network provides cell service to the one or more user devices via the cell tower; at least one of the wireless relays establishes communication with a radio tower and wherein the ad hoc network broadcast radio signals received from the radio tower to the one or more user devices; the wireless communication signals are radio frequencies; the wireless services include Long-Term Evolution (LTE), LTE-Advanced, Wi-Fi and Bluetooth; each UAVs includes a camera system, and the control signals provide instructions to at least one of the UAVs to record photographs or video of the geographical area or structures within the geographical area with the camera system; the at least one UAV transmits the photographs or video to the relay control device; the ad hoc network is a wireless mess network, and wherein the wireless relays serve as mess nodes in the wireless mess network; the at least one of the UAVs is a dirigible; the at least one of the UAVs is a rotary-wing type; and the control signals are determined based on coordinates received from a GNSS.

Other implementations of any of the above aspects include corresponding systems, apparatus, and computer programs that are configured to perform the actions of the methods, encoded on computer storage devices. The present disclosure also provides one or more non-transitory computer-readable media storing instructions that, when executed by the one or more computers, cause the one or more computers to perform operations comprising in accordance with implementations of the methods provided herein. The present disclosure further provides a system for implementing the methods provided herein. The system includes a wireless relay, one or more computers, and one or more computer-readable storage devices storing instructions that, when executed by the one or more computers, cause the one or more computers to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure will be discussed in further detail with reference to an example context. The example context includes areas that have experienced some form of emergency or natural disaster. It is appreciated, however, that implementations of the present disclosure can be realized in other appropriate contexts, e.g., critical mass problems. In the example context, these areas can include various structure such as dwellings, towers, office buildings, etc.

Figure 1:
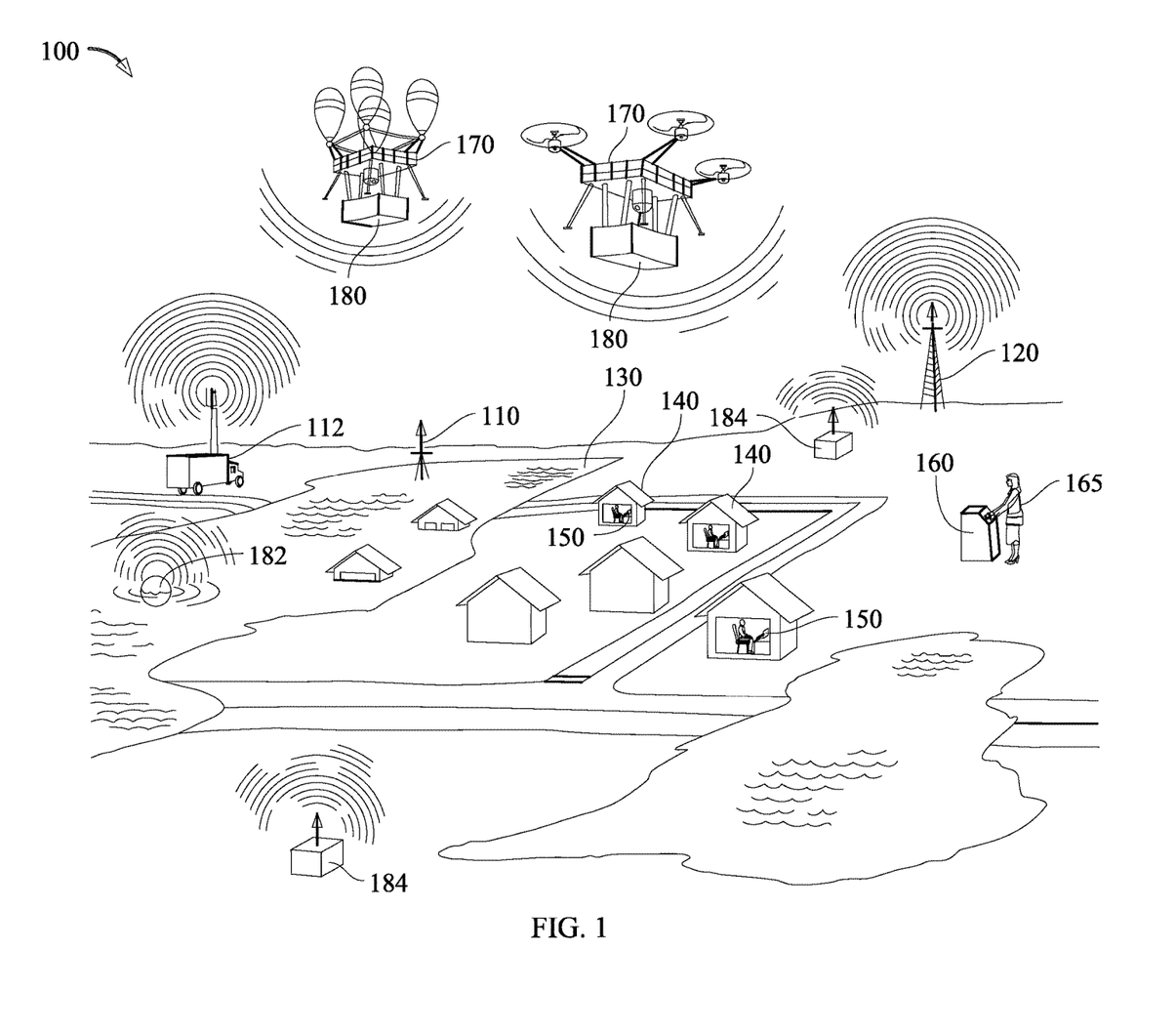
FIG. 1 depicts an example system that can execute implementations of the present disclosure deployed in a geographical area.

FIG. 1 depicts an example system that can execute implementations of the present disclosure deployed in a geographical area, such as geographical area 100. Geographical area 100 includes structures, such as structures 140, cell towers, such as cell towers 110, 112, television and radio tower 120, and may include a body of water, such as body of water 130. Users having one or more devices, such as user devices 150, may be within geographical area 100. The example system may include wireless relays, such as wireless relays 180, 182, and 184, UAVs, such as UAVs 170, relay control device, such relay control device 160, and a human controller, such as human controller 165.

The example system, which may include wireless relays 180, 182, and 184, may be deployed into a geographical area, such as geographical area 100, after an extreme event such as a natural disaster (e.g., hurricanes, ice storms, floods, or tornados) or a manmade catastrophe (e.g., an attack or bombing). The wireless relays may be deployed into a geographical area as a payload or component of a UAV, such as UAVs 170, as ground based wireless relays, such as ground based wireless relays 184, and/or as a buoy wireless relay, such as buoy wireless relay 182. The extreme event may create a body of water, such as body of water 130, by flooding, for example, a flood plain surrounding an existing river or stream. The extreme event may damage structures in geographical area 100, such as structures 140. The extreme event may disable cell towers and other communications channels, such as cell towers 110, 112 and television and radio tower 120, within the geographical area. In FIG. 1, cell tower 110 represents a disabled cell tower, while cell tower 112 represent an undamaged tower or mobile cell site.

Cell towers 110 and 112 and television and radio tower 120 may be a radio mast, tower, or other raised structure where antennae and electronic communications equipment are placed to create a cell in a cellular network. In some examples, cell tower 112 may be a mobile cell site. A mobile cell site is a cell site that is transportable on trucks or other type vehicles that may be deployed in an emergency situation or to allow for installation in a restricted space. Mobile cell sites include, but are not limited to, Rapid-deployment units (RDU) and Cell on Wheels (COW). In some examples, television and radio tower 120 is masts- or tower-designed to support antennas or aerials for telecommunications and broadcasting, which includes, but is not limited to, broadcasting television and radio frequencies.

After an extreme event, wireless relays, such as wireless relays 180, 182, and 184, may be deployed to establish a wireless ad hoc network. Such an established wireless ad hoc network may provide cell coverage through communication with cell towers, such as cell tower 112, and may be used to broadcast radio wave signals broadcast from television and radio towers, such as television and radio tower 120, to user devices, such as user devices 150. Additionally, UAVs, such as UAVs 170 and buoy wireless relay 182, may be used to survey the damage caused by the extreme event. The UAVs and buoy wireless relay may receive control signals from and send signals to a relay control device, such as relay control device 160.

In some examples, the disclosed system provides for the remote gathering of information, which may be in the form of photographic images and/or video media format that is captured by UAVs, such as UAVs 170, or by buoy wireless relays, such as buoy wireless relay 182. The collected information may be used to mitigate the loss of critical information gathering after an extreme event. The system includes a protocol for activating, dispatching, and communicating with the deployed wireless relays and any associated UAVs.

In some implementations, wireless relays, such as wireless relays 180, 182, and 184, may be various types of devices that transmit and receive electromagnetic frequencies, such as radio frequencies between around 3 kHz to 300 GHz. The wireless relays may be in wireless communication with each other and other devices on the ground, such as mobile cell tower 112, television relay control device 160, and/or user devices 190 and 192, using electromagnetic frequencies to form a wireless ad hoc network. In some implementations, wireless relays may receive a series of network commands from the relay control device to establish the wireless ad hoc network.

Wireless relays, such as wireless relays 180, 182, and 184, may provide, through an established wireless ad hoc network, various wireless services, such as LTE, LTE-Advanced, Wi-Fi, Short Message Service (SMS), and/or Bluetooth. These wireless services may be used to communicate with devices on the ground, such as user devices 150. In some examples, the wireless relays may receive and transmit these wireless services to devices on the ground through, for example, a universal antenna. A universal antenna is a device that can be used to send signals using various wireless technologies and radio wave frequencies. Wireless relays may also integrate other complementary forms of wireless connectivity, such as GNSS and Near-field communication (NFC), and may also cover multiple bandwidths, such as cellular.

In some implementations, wireless relays, such as wireless relays 180, 182, and 184, may form a plurality of links between one another where each link connects two of the wireless relays. These links can be used to form a wireless ad hoc network where each of the wireless relays serves as node. Nodes in a wireless ad hoc network participate in routing by forwarding data for other nodes. In such networks, the determination as to which mode forwards received data is made dynamically on the basis of, for example, network connectivity. To forward data, a wireless ad hoc network may use classic routing, where a particular path is selected to forward an incoming packet, or flood routing, where an incoming packet is sent through all outgoing links (except the link on which the packet arrived). In some implementations, the wireless ad hoc network may be employed to reestablish communication across damaged or isolated "islands" where established communication channels have been destroyed, damaged, and/or hindered.

In some implementations, the formed wireless ad hoc network may be a wireless mesh network. A wireless mesh network is a communications network made up of radio nodes organized in a mesh topology. Each node is a wireless mesh network relays data for the network to facilitate the distribution of data within the network. Routing methods within a mesh network allow for constant adaptations when, for example, new network nodes are added or existing network nodes are removed or fail. In some examples, the formed ad hoc network can be referred to as an upper-level network. Wireless mesh network may be employed to expand coverage while not interfering with established signals.

Wireless relays, such as wireless relays 180, 182, and 184, may employ various specification, such as Long Range (LoRA), to form wireless a wireless ad hoc network. In such example, the wireless ad hoc network may be a Low-Power Wide-Area Network (LPWAN). A LPWAN is a type of wireless telecommunication network designed to allow long range communications at a low bit rate among connected objects, such as battery operated sensors.

Wireless relays, such as wireless relays 180, 182, and 184, may be in communication with cell towers, such as cell towers 112, and/or television and radio towers, such as television and radio tower 120. Signals from these structures may be received and transmitted through a wireless ad hoc network formed by the wireless relays.

In some implementations, wireless relays, such as wireless relays 180, 182, and 184, may be replaced or work in conjunction with small, low cost satellites ("smallsats"). Such smallsats may include a solar panel(s) to provide power and a foil lining behind the solar panels to provide radiation shielding as well as antennas and other electronics within a shell or housing used for communication purposes. In some implementations, smallsats are between 1 and 100 kilograms in mass. The smallsats may be launched as a payload on a launch vehicle specifically designed for the smallsat or as a secondary payload on larger launch vehicle. Smallsats may be placed in a lower orbit higher than UAVs, such as UAVs 170, but lower than many commercial type satellites. These lower orbits would require little or no thrusting power from the smallsat. These satellites may work with wireless relays to extend the coverage of an ad hoc network between the wireless relays.

User devices, such as user devices 150, may be associated with respective users within a geographical area, such as geographical area 100. In some examples, the user devices may include various forms of processing including, but not limited to, a desktop computer, a laptop computer, a tablet computer, a wearable computer, a handheld computer, a personal digital assistant (PDA), a cellular telephone, a network appliance, a smartphone, an enhanced general packet radio service (EGPRS) mobile phone, or an appropriate combination of any two or more of these example data processing devices and so forth. User devices may also include various forms of radio and television devices. The user devices may receive and transmit communications with wireless relays, such as wireless relays 180, 182, and 184. In some examples, the user devices can communicate with the wireless relays through a universal antenna associate with each wireless relay.

Wireless relays, such as wireless relays 180, 182, and 184, may provide links for point-to-point communication through an established wireless ad hoc network to ground based devices. Wireless relays may also relay emergency frequency modulation (FM)/amplitude modulation (AM) or television signals received by a television and radio tower, such as television and radio tower 120, through an established wireless ad hoc network. Wireless relays may also provide support for Internet of Things (IoT) types of devices through the formed ad hoc network. Additionally, user devices, such as user devices 150, may be able to establish channels to communicate out and receive information from areas unaffected by the extreme event through an established ad hoc network.

In some examples, user devices, such as user devices 150, may be able to communicate with one another through a wireless ad hoc network form by wireless relays, such as wireless relays 180, 182, and 184. In some examples, the user devices may communicate through a wireless ad hoc network when existing cell networks are down or otherwise not functional. In other examples, such a wireless ad hoc network may provide internet service to user devices to allow the devices to communicate (e.g., make calls or send text messages) through an established internet service when existing cell networks are down or otherwise not functional. In some implementations, wireless relays may serve as IoT gateways to allow communication with various user devices employing various protocols, such as Wi-Fi or Bluetooth. In some examples, the wireless relays may provide a level of security and function as a form of a firewall.

Wireless relays, such as wireless relays 180, 182, and 184, may be deployed into a geographic area, such as geographical area 100, in a variety of ways by UAVs, such as UAVs 170, or through a manual process, such as being place by a human actor. For example, as depicted with wireless relay 180, a wireless relay may be deployed above a geographic area as a payload or a component of a UAV as the UAV hovers in proximity to a fix position or circles a fixed position. A wireless relay may also be deployed on the surface of a body of water, as depicted by buoy wireless relay 182. As another example, as depicted by ground based relays 184, a wireless relay may be deployed on or in proximity to a perimeter of the geographical area as a ground based wireless relay.

Wireless relays deployed on the surface of a body of water, such as body of water 110, as a buoy wireless relay, such as buoy wireless relay 182, may include a sensor package. A sensor package can include, but is not limited to, navigation sensors (e.g., GNSS receivers), cameras, environmental sensors, surface mapping sensors, and object delivery equipment. In some examples, buoy relays are designed to float on the surface of the water to ensure that a top surface or side is facing up and out of the water. Power for the buoy wireless relays may come from sources including, but not limited to, internal combustion engines, solar panels, or hydroelectric charging capability. Deployment of buoy wireless relays may be particularly useful in water-locked or flooded areas. In some examples, buoy wireless relays may send signals to a relay control device, such as relay control device 160, regarding data collected by or a status of the buoy wireless relay or other wireless relays that form a wireless ad hoc network with the buoy wireless relays. In some examples, buoy wireless relays may measure a storm surge and communicate the gathered information to individuals nearby or "downstream" from the storm.

Wireless relays deployed on the ground, such as ground based wireless relays 184, may be used to create a perimeter area around damaged portions of a geographic area, which may be inaccessible for human actors. Wireless devices deployed in the air, such as wireless relays 180, and as buoy wireless relays, such as buoy wireless relay 182, may form a wireless ad hoc network with ground based relays, which may be used to communicated with other established communication infrastructure, such as cell towers 112 and television and radio tower 120, that have not been damaged by the extreme event. Power for the ground based wireless relays may come from sources including, but not limited to, internal combustion engines, solar panels, or geothermal type conversion systems. In some examples, ground based wireless relays may send signals to a relay control device, such as relay control device 160, regarding data collected by or a status of the ground based wireless relay or other wireless relays that form a wireless ad hoc network with the ground based wireless relay. In some implementations, a wireless relay, such as wireless relays 180, 182, and 184, may be an on-board component of a UAV, such as UAVs 170. In some implementations, a wireless relay may be a separate payload secured by a UAV through, for example, payload equipment.

UAVs, also known as drones, include aircrafts without a pilot on board. UAVs, such as UAVs 170, can fly by remote control (e.g., flown by a human operator at a ground relay control device) or autonomously based on, for example, pre-programmed flight plans or more complex dynamic automation systems. In some examples, a UAV is capable of controlled, sustained level flight and powered by a jet or reciprocating engine. In some examples, a UAV includes gas bags(s) filled with lifting gases powered with propellers and controlled through rudders. The engines for various UAVs may be internal combustion engines that consume various forms of fuel or use solar energy collected using on-board solar panels.

In some examples, UAV, such as UAVs 170, can include a communications interface, which may be used to communicate with a relay control device, such as relay control device 160, either directly or through a formed wireless ad hoc network. In some examples, a UAV can receive control signals from the relay control device. In some examples, a UAV can send signals to the relay control device regarding collected data and/or other types of device and network status.

UAVs, such as UAVs 170, may include flight controllers, such as 3DR APM, 3DR Pixhawk, DJI A2, DJI Ace One, DJI Naza-M V2, and DJI WooKong. The flight controller of a UAV may control the UAV's propulsion systems and control surfaces to execute autonomously flight plans. In addition, a UAV can include a sensor package. A sensor package can include, but is not limited to, navigation sensors (e.g., GNSS receivers), cameras, environmental sensors, surface mapping sensors, and payload equipment.

In some implementations, UAVs, such as UAVs 170, may be fixed-wing types. A fixed-wing type of UAV includes a rigid wing that has a predetermined airfoil, which make flight capable by generating lift caused by the UAV's forward airspeed. This airspeed is generated by forward thrust by the means of, for example, a propeller being turned by an internal combustion engine or electric motor, or a jet engine. Control of the UAV comes from control surfaces built into the wing itself, these may also include ailerons, an elevator, and a rudder. The elevator controls the pitch (lateral axis). The ailerons control the roll (longitudinal axis). The rudder controls the yaw (vertical axis). A fixed-wing aircraft, such as, for example, a kite or glider, may also glide on moving air. Variable-sweep wing aircraft as well as aircraft that employ wing warping are also considered fixed-wing UAVs.

In some implementations, UAVs, such as UAVs 170, may be rotary-wing types. A rotary-wing type UAV includes one or more rotor blades or wings that revolve around a fixed mast. During flight, the fixed mast revolves many times per minute. A rotary-wing UAVs obtains lift resulting from the constant movement of the rotor blades rotating around the mast producing the required airflow over blades. Rotor blades may be airfoil-shaped, or they may have a flatter slope. The entire assembly of rotor blades and fixed mast is called a rotor. The number of rotor blades and rotors on a given UAV may vary. In some cases, an additional engine is used either for upward lift or forward thrust to reach greater heights and speeds. Rotors may be setup in various configurations. For example, a tricopter has twin rotors on each arm, one pointing upwards and one pointing downwards whereas an X8 consists of a quadcopter with twin motors on each arm. Other common types of rotary-wing UAV include helicopters, cyclocopters, autogyros, and gyrodynes.

In some implementations, UAVs, such as UAVs 170, may be an aerostat. Aerostats are a lighter than air craft, such as an unpowered balloon or a dirigible, that gains lift through the use of a buoyant gas. Dirigibles are lighter-than-air aircraft, such has an airship or dirigible balloon, that can navigate through the air under its own power. Dirigible UAVs may gain their lift from a gas bag(s) filled with a lifting gas, such as hydrogen or helium, that is less dense than the surrounding air. Similar to rotary-wing UAVs, dirigible UAVs may be employed to hover within a proximity of a fix position. However, dirigible UAVs generally use a more limited amount of energy than either rotary-wing or fixed-wing UAVs.

A dirigible UAV may comprise one or more gas bags filed a lifting gas coupled to a rudder to steer the UAV and a propeller of some form to provide motion. The propeller may be coupled to an engine, which may include, but is not limited to, an internal combustion or solar powered engine, to provide power to the propeller. Additionally, dirigible UAVs may contain a mechanism to release or filled the gas bag(s) with the contained lifting gas. Such a mechanism may be coupled to a compressor that contains the appropriate lifting gas under pressure. In some examples, a dirigible UAV may be free floating.

In some example, an aerostat UAV may be anchored to the ground by, for example, one or more tethers. In such examples, the anchors be employed to steer (e.g., wrench) a respective aerostat UAV into position.

In some example, dirigible UAVs, such as UAVs 170, may comprise a height sensor, a processing unit, a compressed lifting gas storage device, an intake valve, and a release value. The height sensor may determine a height and, based on instructions received from a relay control device, such as relay control device 135, may determine, though the processing unit, to increase the buoyancy of the UAV by filling, though the intake value, the gas bag(s) with a determined amount of the lifting gas contained within the lifting gas storage device. Alternatively, the processing unit may determine, based on the received instructions, to decrease the buoyancy of the UAV by releasing a determined amount of lifting gas from the gas bag(s) though the release value.

In some implementations, UAVs, such as UAVs 170, and wireless relays, such as wireless relays 180, 182, and 184, may be in communication with a relay control device, such as relay control device 160. In some examples, wireless relays may be in direct communication with a relay control device. In some examples, wireless relays may communicate with a relay control device through a corresponding UAV. In some implementations, UAVs may be managed and/or controlled using the relay control device. UAVs may be utilized to assess a geographical area, such as geographical area 100, of widespread damage when, for example, the area may be too dangerous or large for individuals to manage the collection of data within a specific amount of time. In some implementations, a number of the UAVs may be autonomous and not in communication with a relay control device. For example, a buoy or balloon type UAV may be deployed to a fixed area.

A relay control device, such as relay control device 160, may comprise systems that communicate with a series of GNSS satellites, UAVs, such as UAV 170, and wireless relays, such as wireless relays 180, 182, and 184. A relay control device may include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. A relay control device can include, for example, a computer network communication interface (e.g., Wi-Fi or Bluetooth), a cellular communication interface (e.g., an LTE interface), and/or an RF communication interface. In some examples, a relay control device can communicate with the user devices, such as user devices 150, through an application on the user devices. A relay control device may also be configured to communicate with an offsite server that is not in the geographic area where the disclosed system is deployed. A relay control device may communicate with an offsite server through a network or direct connection link. In some implementations, a relay control device may be a series of devices clustered or in communication using a network. In some implementations, a relay control device may be a satellite relay station.

A relay control device, such as relay control device 160, may include systems that enable a human controller, such as human controller 165, to launch and generally send commands to UAVs, such as UAVs 170. In some implementations, a relay control device would assume control of UAVs after an initial launch and would coordinate the waypoint navigation alongside the human controller. In some implementations, a relay control device would relay communications (e.g., messages and/or commands) received from an offsite server outside of the geographical area. Additionally, buoy wireless relays, such as buoy relay 182, may gauge the depth of flood water on which they are placed. Furthermore, a relay control device may manage the flight patterns of UAVs to avoid conflicts with other air traffic to keep compliance with federal rules and regulations concerning the use of UAVs for commercial purposes. In some examples, UAVs may capture images and/or video through various cameras. The collected information may be sent to the relay control device. In some examples, the relay control device may send captured images and/or video received from a UAV to the offsite server for safe storage of the captured content.

In some implementations, a human controller, such as human controller 165, may control a UAV, such as UAVs 180, 182, and 184, after the UAV has been launched into airspace and en route to a geographical area where an extreme event has occurred, such a geographical area 100. In some implementations, as the UAV moves away from the line-of-sight of the human controller, a relay control device, such as relay control device 160, may assume control of the UAV and coordinate a flight path over the geographical area with the GNSS satellites. In some implementations, the human controller may retain managed control of UAV by controlling the onboard camera systems as the vehicle moves along a flight path. In some implementations, the relay control device coordinates general flight patterns between multiple UAVs to provide flight control support in order to eliminate potential collisions with other aircraft and other UAVs.

The disclosed system may help to mitigate the loss of important damage data that may be used to efficiently and accurately assess the financial impact of an extreme natural or unnatural event covering a large area of real estate or land. As an example, an extreme event the includes a tornado and rain, which results in flooding, may impact a geographical area, such as geographical area 100. The geographical area may quickly become inaccessible by any ground vehicles and of such size that damage to the area cannot be adequately assessed by individuals. The disclosed system may then be deployed to the geographical area.

Once deployed, a relay control device, such as relay control device 160, may be setup and a series of UAVs, such as UAVs 170, may be deployed. The UAVs may be controlled during launch by a human controller, such as human controller 165. Once the UAVs are out of a line-of-sight of the human controller, the human controller may activate a camera control systems and the relay control device may assume flight control of the UAV. In some implementations, the relay control device may maintain control of the UAVs throughout the launch. The UAVs flight path may be based on the coordinates received from an offsite server and/or from communication with GNSS satellites. The relay control device may relay messages received from the GNSS satellites to accurately route the UAVs through the air traffic toward the geographic area.

The deployed UAVs may include wireless relays, such as wireless relays 180, as payloads or components. Additionally, wireless relays may be deployed on or in proximity to a perimeter of the geographical area as a ground based wireless relays, such as ground based wireless relays 184. Further, wireless relays, may be deployed on the surface of a body of water, such as body of water 130, within the geographic area as buoy wireless relays, such as buoy wireless relay 182. These wireless relays may be used to form a wireless ad hoc network, which can communicate with devices on the ground, such as user devices 150, as well as establish cell service and provide a mechanism for the devices to received broadcast type services, such as television and radio signals. Cell service provided through the ad hoc network may include providing Global System for Mobile communication (GSM) and Short Message Service (SMS) though the wireless ad hoc network.

Once the UAV arrives over the geographic area, the human controller may confirm that the UAVs are in a correct location and beginning recording photograph and video evidence using the camera systems on the UAVs. The UAVs may provide multiple photographs at varying zoom levels to provide additional layers of detail. The UAVs may also relay media through the relay control device to an off site server for redundancy and to mitigate data loss as a contingency. For example, the UAVs may provide an array of overlapping images through an established ad hoc network to create a full map of the geographic area and structures within the area.

After the geographic area has been fully surveyed, the human controller may initiate a request for a return home flight pattern with the relay control device. In some implementations, the UAVs may hold a position to allow the formation and maintenance of an ad hoc wireless network created using wireless relays until the ad hoc network is no longer necessary (e.g., normal commination services have been restored). At which time, the human controller may initiate a request for a return home flight pattern with the relay control device.

Once a return home flight pattern has been requested, the relay control device may coordinate the return of the UAVs to a mobile launch station with the location information retrieved from the GNSS satellites. Relay control device may navigate the UAVs through the air traffic in accordance with Federal Aviation Administration (FAA) regulations to return the UAV to the line-of-sight region of the human controller who when land the vehicle. Once within the line of site, the human controller may assume unmanaged control of the UAVs. The pilot will control the UAVs in flight pattern in accordance with the rules and regulation of the UAV piloting licensing held by the human controller. Additionally, once the ad hoc network is no longer necessary, the deployed ground based wireless relays and buoy wireless relays may be recovered.

Figure 2:
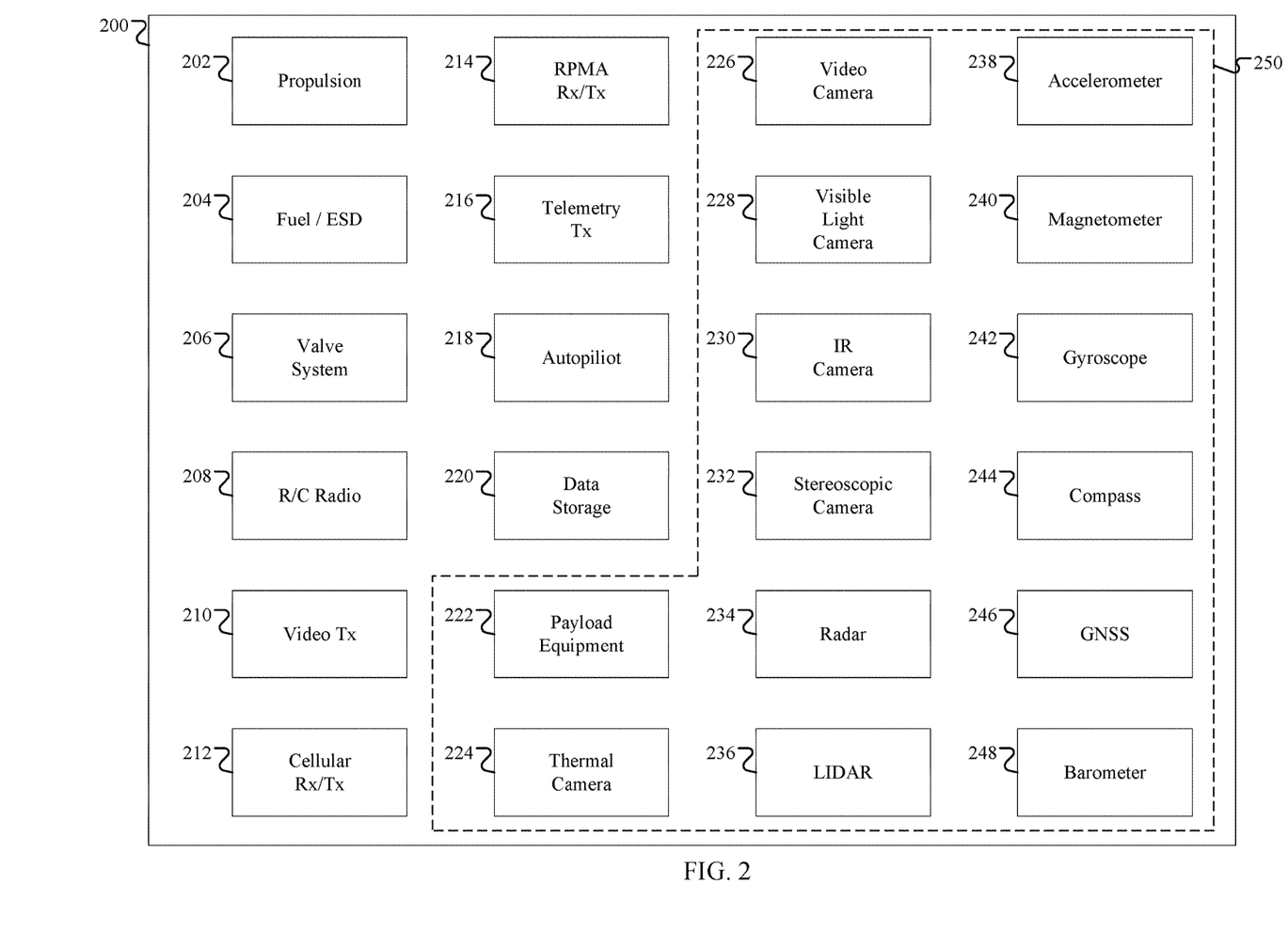
FIG. 2 depicts a block diagram representing an example UAV.

FIG. 2 depicts a block diagram of an example UAV 200. UAV 200 is substantially similar to UAVs 170 from FIG. 1. In some examples, the UAV 200 can be remotely controlled to fly or programmed to fly a course over a geographical area where an extreme event has occurred. In some examples, UAV 200 is provided as a fixed wing aircraft. In some examples, the UAV 200 is a rotary wing aircraft. In some examples, the UAV 200 is a dirigible.

In the example of FIG. 2, the UAV 200 includes a propulsion system 202 and an energy source 204. Example propulsion systems 202 include one or more combustion engines that drive one or more propellers or blades, and one or more electric machines that drive one or more propellers or blades. It is contemplated, however, that the UAV 200 can be propelled by any appropriate propulsion system, or combination of propulsion systems. Example energy sources 204 can include fuel (e.g., gasoline) and/or an energy storage device (e.g., a battery, a capacitor). In some examples, the energy source 204 includes one or more fuel cells. In some examples, the energy source includes one or more solar panels. If the UAV 200 is a dirigible, propulsion system 202 may work in tandem with a value system 206 to release and/or filled the gas bag(s) with a lifting gas that may be contained within a pressurized container.

In the depicted example, the UAV 200 further includes a radio control (RIC) receiving (Rx) component 208, a video transmitting (Tx) component 210, a cellular receiving/transmitting (Rx/Tx) component 212, a signal receiving/receiving (Rx/Tx) component 214, a telemetry transmitting (Tx) component 216, an auto-pilot component 218, a data storage component 220, payload equipment 222, a thermal camera component 224, a video camera component 226, a visible light camera component 228, an infrared camera component 230, a stereoscopic camera component 232, a radar component 234, a light detection and ranging (LIDAR) component 236, an accelerometer component 238, a magnetometer component 240, a gyroscope component 242, a compass component 244, a GNSS component 246, and a barometer component 248. The components depicted in FIG. 2, and described herein, are example components, and it is appreciated that the UAV 200 can include more or fewer components.

In some implementations, the radio control (RIC) receiving (Rx) component 208 and/or the autopilot component 218 enable control of the UAV 200. In some examples, the radio control (RIC) receiving (Rx) component 208 receives signals from a remote controller, such a relay control device 135 from FIG. 1. The received signals are processed to control operation of the UAV 200 (e.g., control the propulsion system 202, control flight components, such as aileron, flap, elevator, rudder, rotor blade pitch). In some examples, the autopilot component 218 provides control signals to control operation of the UAV 200 (e.g., control the propulsion system 202, control the valve system 206, and control flight components, such as aileron, flap, elevator, rudder, rotor blade pitch). In some examples, the autopilot component 218 controls operation of the UAV 200 based on a preprogrammed flight plan (e.g., stored in the data storage 220) and one or more signals provided from one or more other components (e.g., the radar component 234, the accelerometer component 238, the magnetometer component 240, the gyroscope component 242, the compass component 244, and/or the GNSS component 246).

In some implementations, one or more components of the UAV 200 communicate with one another. In some examples, the UAV 200 can include a bus system that enables communication between components. For example, data generated and/or received by one or more components can be communicated to the data storage component 220. As another example, data stored in the data storage component can be communicated to one or more other components (e.g., the video transmitting (Tx) component 210 to transmit video data from the UAV 200).

In some implementation, UAV 200 may include a sensor package that includes payload equipment 222, a thermal camera component 224, a video camera component 226, a visible light camera component 228, an infrared camera component 230, a stereoscopic camera component 232, a radar component 234, a light detection and ranging (LIDAR) component 236, an accelerometer component 238, a magnetometer component 240, a gyroscope component 242, a compass component 244, a GNSS component 246, and a barometer component 248. The components depicted in FIG. 2, and described herein, are example components, and it is appreciated that the UAV 200 can include more or fewer components. The components depicted in senor package 250, and described herein, are example components, and it is appreciated that the sensor package 250 can include more or fewer components.

In some implementations, payload equipment 222 may be equipment that is used to attach and/or secure a payload, such as wireless relays 112, 116, 122, 132 from FIG. 1, to the UAV 200. In some implementations, one or more camera components can be provided as a single camera. In some examples, the thermal camera component 224, the video camera component 226, the visible light camera component 228, the IR camera component 230, and the stereoscopic camera component 232 can be provided as a single camera component (e.g., a camera that captures visible light images/video, thermal images/video, infrared images/video, and/or stereoscopic images/video), or two or more camera components. In some implementations, the one or more of the camera components 224, 226, 228, 230, 232 capture images and/or video of the geographic region, over which the UAV 200 flies. In some examples, and as described in further detail herein, the images and/or video are used to provide damage assessments of a geographical area affected by an extreme event as described above, and/or structures within the geographical area.

In some implementations, the signal receiving/receiving (Rx/Tx) component 214 receives and transmits signals, while the UAV 200 flies over the geographic area. In the example context, the signals include RPMA signals. It is appreciated, however, that any appropriate type of signal can be received and/or transmitted. In some examples, and as described in further detail herein, data associated with the signals is used to provide damage assessments of a geographical area affected by an extreme event as described above, and/or structures within the area. Example data can include an identifier indicating a source of a received signal, a strength of a received signal, a location of the UAV 200 when a signal is transmitted, and the like.

In accordance with implementations of the present disclosure, a UAV, such as the UAV 200 of FIG. 2, is flown over a geographical region and includes a wireless relays device, such as wireless relays 112, 116, 122, and 132 of FIG. 1, as a payload or as an internal component of the UAV. The wireless relay may be used to form an ad hoc wireless network as described above.

In some examples, the geographical area includes one or more structures, which may have been damaged during an extreme event. In some implementations, the UAVs captures images and/or video as it flies over the geographical area. In some implementations, the UAV periodically captures signal strength, GNSS location, multi-resolution (e.g., high resolution, low resolution) images and/or videos and any other sensor data as it flies over the geographical area. In some examples, the UAV flies on a flight path that is defined by two or more waypoints (e.g., remotely controlled, on autopilot). In some examples, the cameras and other sensor components are controlled directly by a human controller.

In some implementations, data recorded by the UAV is offloaded to one or more computing devices, such as relay controller 135 of FIG. 1. In some examples, data recorded by the UAV (e.g., stored in the data storage component 220) is wirelessly transmitted to the one or more computing devices (e.g., during flight, after the UAV lands). In some examples, data recorded by the UAV (e.g., stored in the data storage component 220) is transmitted to the one or more computing devices by wire (e.g., after the UAV lands). In some implementations, the data is offloaded to one or more computing devices of a back-end system.

Figure 3:
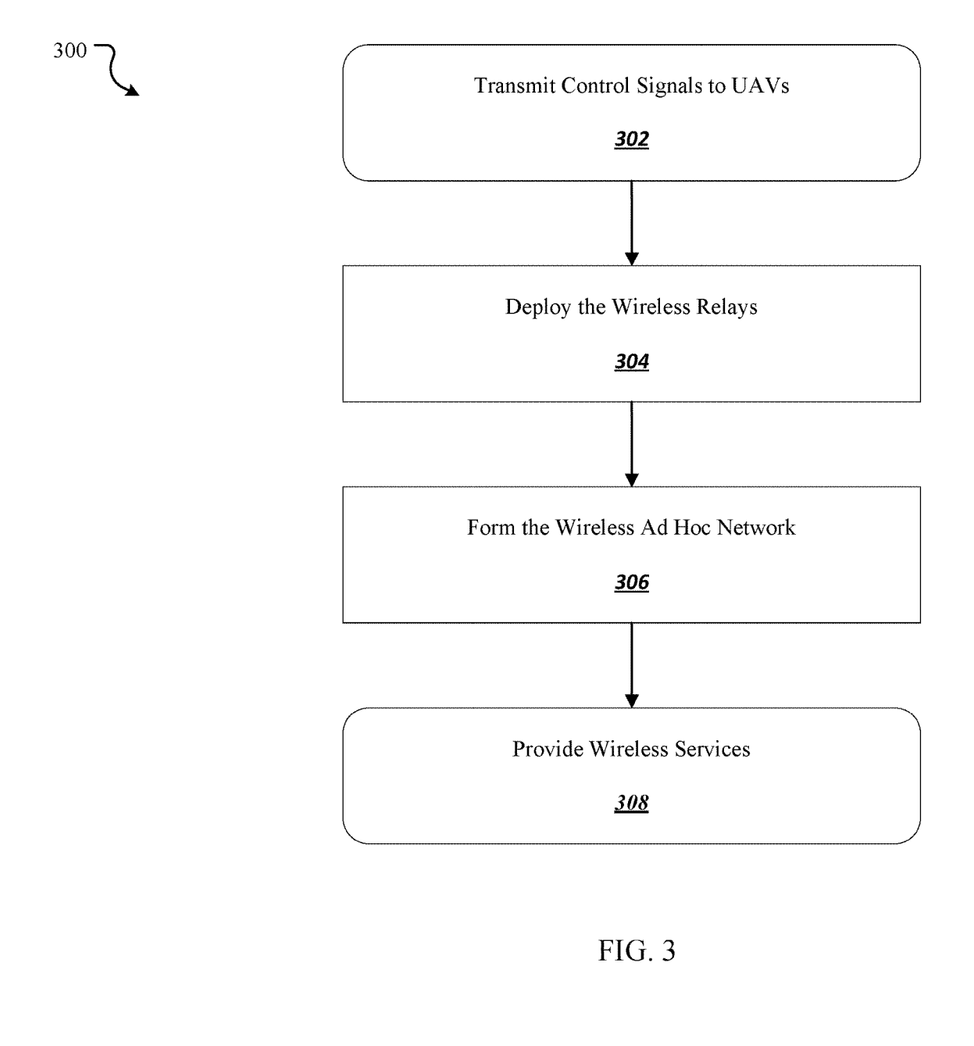
FIG. 3 depicts a flow diagram of an example process to deploy an ad hoc network using UAVs.

FIG. 3 depicts a flow diagram of an example process 300 to deploy an ad hoc network using UAVs. For clarity of presentation, the description that follows generally describes method 300 in the context of FIGS. 1, 2, and 4. However, it will be understood that process 300 may be performed, for example, by any other suitable system, environment, software, and hardware, or a combination of systems, environments, software, and hardware as appropriate. In some implementations, various steps of process 300 can be run in parallel, in combination, in loops, or in any order.

At 302, relay control device 160 transmits command signals to UAVs 170, which as associated with a wireless relay that is configured to receive and transmit wireless communication signals. From 302, the process 300 proceeds to 304. At 304, the UAVs deploy the respective wireless relay, according to the command signals, at one or more locations within a geographical area. From 304, the process 300 proceeds to 306. At 306, the wireless relays establish, through the wireless communication signals, links between them to form the wireless ad hoc network. In some implementations, each of the established links connects two of the wireless relays. From 306, the process 300 proceeds to 308. At 308, the established wireless ad hoc network is employed to provide wireless services to one or more user devices within the geographical area. From 308, the process 300 ends.

Figure 4:
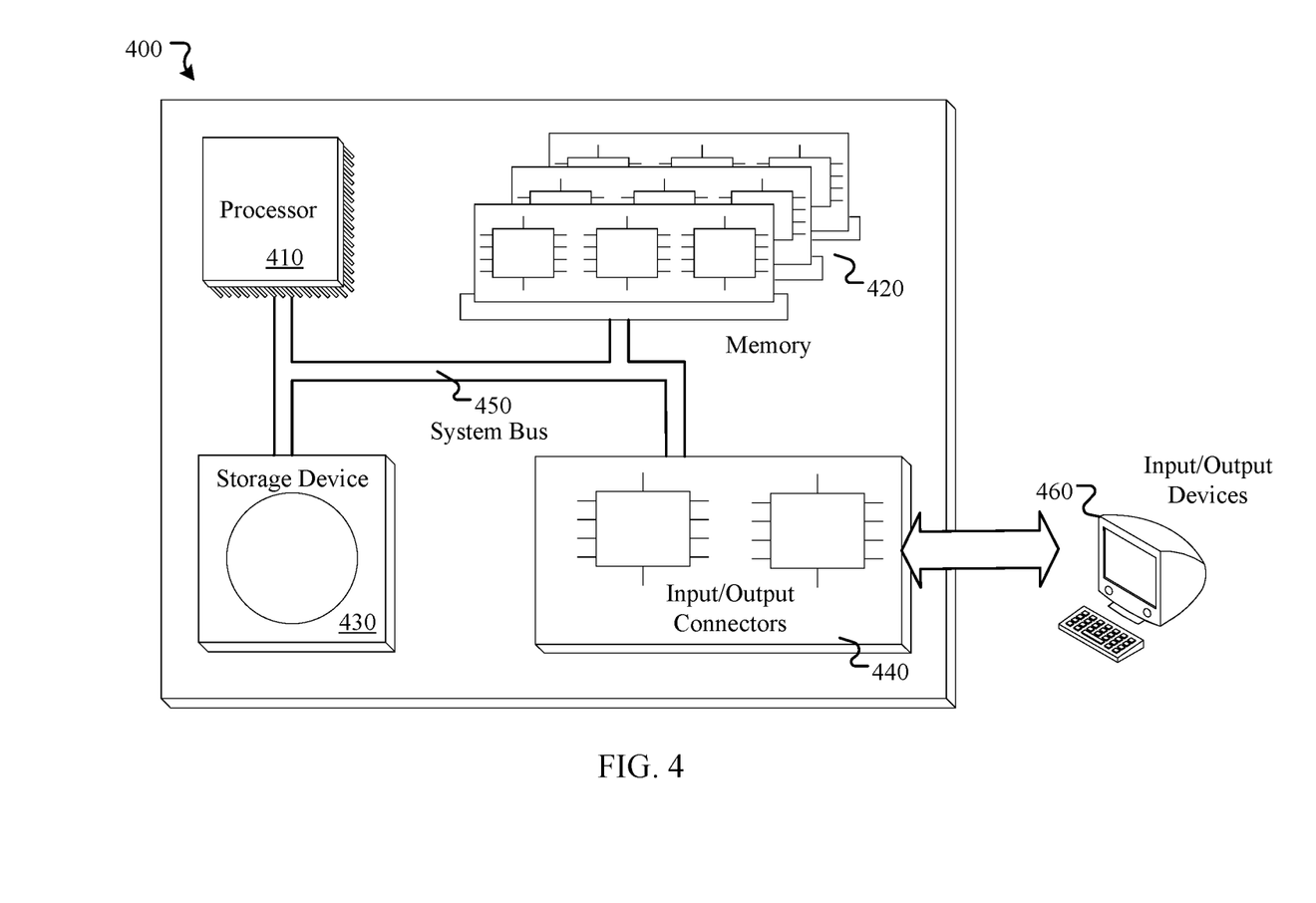
FIG. 4 is a schematic illustration of example computer system that can be used to execute implementations of the present disclosure.

FIG. 4 is a schematic diagram of an example computer system 400 that can be used to execute implementations of the present disclosure. The system 400 can be used for the operations described in association with the implementations described herein. For example, the system 300 may be included in any or all of the computing components discussed herein to include user devices, wireless relays, relay control devices, offsite server, flight control systems, and sensor packages. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The computer system 400 is intended to include various forms of digital computers, such as laptops, desktops, workstations, personal digital assistants, servers, blade servers, mainframes, and other appropriate computers, including vehicles installed on base units or pod units of modular vehicles. The computer system 400 can also include mobile devices, such as personal digital assistants, cellular telephones, smartphones, and other similar computing devices. Additionally, the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The computer system 400 includes a processor 410, a memory 420, a storage device 430, input/output connectors 440, and an input/output device 460. Each of the components 410, 420, 430, 440 are interconnected using a system bus 450. The processor 410 is capable of processing instructions for execution within the computer system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor. In one implementation, the processor 410 is a single-threaded processor. In another implementation, the processor 410 is a multi-threaded processor. The processor 410 is capable of processing instructions stored in the memory 420 or on the storage device 430 to display graphical information, such as a user interface, on the input/output device 460 thorough the input/output connectors 440.

The memory 420 stores information within the computer system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

In various different implementations, the input/output connectors 440 allow external devices, such input/output device 460, to communicate with the others system components (e.g., the processor 410, the memory 420, and the storage device 430) through the system bus 450.

The input/output device 460 provides input/output operations for the computer system 400. In one implementation, the input/output device 460 includes a keyboard and/or a printing device. In another implementation, the input/output device 460 includes a display unit for displaying, for example, graphical user interfaces.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a GNSS receiver, or a portable storage device, e.g., a universal serial bus (USB) flash drive, to name just a few Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

In some examples, a flight plan, modification to a flight plan, or modified flight plan can include a set of instructions that are executable by a relay control device to control one or more flight characteristics (e.g., speed, direction, altitude, etc.) of a UAV in accordance with the flight plan, modification to a flight plan, or modified flight plan.

A number of implementations have been described. Nevertheless, it will be understood that various modifications, substitutions, and alterations may be made without departing from the spirit and scope of the disclosure. For example, various forms of the flows shown above may be used, with steps re-ordered, added, or removed. Accordingly, other implementations are within the scope of the following claims as the above description of example implementations does not define or constrain this disclosure.

The invention claimed is:

1. A method of establishing a wireless ad hoc network, the method comprising:
    transmitting, through a first network, control signals to a plurality of unmanned aerial vehicles (UAVs), each of the UAVs including a camera system and a wireless relay configured to receive and transmit wireless communication signals, the control signals:
        instructing at least one of the UAVs to record, with the respective camera system, photographic data of a geographical area where a given event has occurred to identify one or more portions of the graphical area damaged by the given event, and
        instructing the UAVs to deploy a plurality of wireless relays at a plurality of locations within the geographical area, including releasing the plurality of wireless relays from the UAVs onto the ground to create a perimeter area around the one or more portions of the geographical area damaged by the given event;
    upon deployment of the wireless relays by the UAVs:
        transmitting, through the first network, network commands to the wireless relays, the network commands instructing the wireless relays to establish, through the wireless communication signals, a plurality of links between the wireless relays, wherein each of the links connects two of the wireless relays;
        forming, from the established links, a wireless ad hoc network among the wireless relays, with the wireless ad hoc network being distinct from the first network through which the control signals are transmitted;

employing the wireless ad hoc network to re-establish communication channels that have been damaged by the given event,
wherein the wireless ad hoc network provides wireless services to one or more user devices within the geographical area and wherein the UAVs remain at the plurality of locations within the geographical area during the forming of the ad hoc network; and
upon determining that the wireless services should no longer be provided, coordinating the return of each of the UAVs to a launch station location;
receiving, via the established wireless ad hoc network, the photographic data from the at least one of the UAVs; and
analyzing the received photographic data to determine a damage assessment of the geographical area.

2. The method of claim 1, wherein at least one of the wireless relays establishes communication with a cell tower and wherein the wireless ad hoc network provides cell service to the one or more user devices using the cell tower.

3. The method of claim 1, wherein at least one of the wireless relays establishes communication with a radio tower and wherein the wireless ad hoc network broadcast radio signals received from the radio tower to the one or more user devices.

4. The method of claim 1, wherein the wireless communication signals comprise radio frequencies.

5. The method of claim 1, wherein the wireless services include Long-Term Evolution (LTE), LTE-Advanced, Wi-Fi and Bluetooth.

6. The method of claim 1, wherein the photographic data includes photographs or video of structures within the geographical area.

7. The method of claim 1, wherein the wireless ad hoc network is a wireless mesh network, and wherein the wireless relays serve as mesh nodes in the wireless mesh network.

8. The method of claim 1, wherein at least one of the UAVs is a dirigible.

9. The method of claim 1, wherein at least one of the UAVs is a rotary-wing type.

10. The method of claim 1, wherein the control signals are determined based on coordinates received from a Global Navigation Satellite System (GNSS).

11. The method of claim 1, further comprising extending a range of the ad hoc wireless network using one or more smallsats.

12. One or more non-transitory computer-readable media storing instructions that, when executed by one or more computers, cause the one or more computers to perform operations comprising: transmitting control signals to a plurality of unmanned aerial vehicles (UAVs), each of the UAVs including a camera system and a wireless relay configured to receive and transmit wireless communication signals, the control signals: instructing at least one of the UAVs to record, with the respective camera system, photographic data of a geographical area where a given event has occurred to identify one or more portions of the graphical area damaged by the given event, and instructing the UAVs to deploy a plurality of wireless relays at a plurality of locations within the geographical area, including releasing the plurality of wireless relays from the UAVs onto the ground to create a perimeter area around the one or more portions of the geographical area damaged by the given event; upon deployment of the wireless relays by the UAVs: transmitting network commands to the wireless relays, the network commands instructing the wireless relays to establish, through the wireless communication signals, a plurality of links between the wireless relays, wherein each of the links connects two of the wireless relays; forming, from the established links, a wireless ad hoc network among the wireless relays, with the wireless ad hoc network being distinct from the network through which the control signals are transmitted; employing the wireless ad hoc network to re-establish communication channels that have been damaged by the given event, wherein the wireless ad hoc network provides wireless services to one or more user devices within the geographical area and wherein the UAVs remain at the plurality of locations within the geographical area during the forming of the ad hoc network; and upon determining that the wireless services should no longer be provided, coordinating the return of each of the UAVs to a launch station location; receiving, via the wireless ad hoc network, the photographic data from the at least one of the UAVs; and analyzing the received photographic data to determine a damage assessment of the geographical area.

13. The one or more non-transitory computer-readable media of claim 12, wherein the photographic data includes photographs or video of structures within the geographical area.

14. A system comprising:
a plurality of wireless relays, wherein each of the wireless relays is configured to:
receive and transmit wireless communication signals, and
establish a plurality of links between other wireless relays deployed within a geographical area to form a wireless ad hoc network;
a plurality of unmanned aerial vehicles (UAVs), wherein each of the UAVs is configured to secure a respective one of the wireless relays and wherein each of the UAVs comprises a camera system;
one or more computers; and
one or more computer-readable storage devices storing instructions that, when executed by the one or more computers, cause the one or more computers to perform operations comprising:
transmitting, through a first network, control signals to the UAVs:
instructing the least one of the UAVs to record, with the camera system, photographic data of a geographical area where a given event has occurred to identify one or more portions of the graphical area damaged by the given event, and
instructing the UAVs to deploy the plurality of wireless relays at a plurality of locations within the geographical area, including releasing the plurality of wireless relays from the UAVs onto the ground to create a perimeter area around the one or more portions of the geographical area damaged by the given event; and
upon deployment of the wireless relays by the UAV:
transmitting network commands to the wireless relays instructing the deployed wireless relays to establish, through the wireless control signals, a plurality of links between the wireless relays, wherein each of the links connects two of the wireless relays;
forming, from the established links, a wireless ad hoc network among the wireless relays, with the wireless ad hoc network being distinct from the first network;

employing the wireless ad hoc network to re-establish communication channels that have been damaged by the given event, wherein the wireless ad hoc network provides wireless services to one or more user devices within the geographical area and wherein the UAVs remain at the plurality of locations within the geographical area during the forming of the ad hoc network; and upon determining that the wireless services should no longer be provided, coordinating the return of the UAVs to a launch station location;

receiving, via the wireless ad hoc network, the photographic data from the at least one of the UAVs; and analyzing the received photographic data to determine a damage assessment of the geographical area.

15. The system of claim 14, wherein each of the locations within the geographical area is a respective fixed position at a respective altitude, and wherein the control signals instruct a respective one of the UAVs to hover in proximity to the fixed position.

* * * * *

UNITED STATES PATENT AND TRADEMARK OFFICE
CERTIFICATE OF CORRECTION

PATENT NO. : 11,196,478 B1
APPLICATION NO. : 15/904697
DATED : December 7, 2021
INVENTOR(S) : Alexander B. Nagelberg and Jess Gingrich Page 1 of 1

It is certified that error appears in the above-identified patent and that said Letters Patent is hereby corrected as shown below:

In the Specification

Column 2 (Abstract), Line 7, delete "ad wireless" and insert -- wireless ad --.

In the Claims

Column 18, Line 48, Claim 1, delete "graphical" and insert -- geographical --.

Column 19, Line 58, Claim 12, delete "graphical" and insert -- geographical --.

Column 20, Line 36, Claim 14, delete "relays" and insert -- relays, --.

Column 20, Line 48, Claim 14, delete "graphical" and insert -- geographical --.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*